US008438333B2

(12) United States Patent
Edwards, III et al.

(10) Patent No.: US 8,438,333 B2
(45) Date of Patent: May 7, 2013

(54) SYSTEMS AND METHODS FOR AUTOMATICALLY GENERATING A MIRRORED STORAGE CONFIGURATION FOR A STORAGE ARRAY

(75) Inventors: William C. Edwards, III, Round Rock, TX (US); Patrick O. Boyd, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 794 days.

(21) Appl. No.: 12/029,219

(22) Filed: Feb. 11, 2008

(65) Prior Publication Data

US 2009/0204757 A1 Aug. 13, 2009

(51) Int. Cl.
*G06F 12/00* (2006.01)
(52) U.S. Cl.
USPC .............. 711/114; 707/687; 714/2; 714/6.22
(58) Field of Classification Search ................ 711/114; 707/687; 714/2, 6.22
See application file for complete search history.

(56) References Cited

U.S. PATENT DOCUMENTS

| 5,185,884 A * | 2/1993 | Martin et al. ..................... 714/6 |
| 6,076,142 A | 6/2000 | Corrington et al. ............ 711/114 |
| 6,098,119 A * | 8/2000 | Surugucchi et al. ............ 710/10 |
| 2004/0123062 A1 * | 6/2004 | Dalal et al. ..................... 711/170 |
| 2004/0133742 A1 * | 7/2004 | Vasudevan et al. ........... 711/114 |

OTHER PUBLICATIONS

Gene Nagle, iStor Networks, Inc.:The Data Protection Advantages of iStor Intelligent RAID Management, 4 pages, [copyright 2008 as noted on last page].

* cited by examiner

*Primary Examiner* — Matthew Bradley
(74) *Attorney, Agent, or Firm* — Baker Botts L.L.P.

(57) ABSTRACT

An information handling system includes a plurality of storage enclosures, a plurality of logical storage units located in each storage enclosure, a controller connected to each of the plurality of logical storage units. The controller is configured to receive data regarding the plurality of logical storage units, and automatically execute an algorithm based on the received logical storage unit data to generate a mirrored storage configuration to be implemented, the mirrored storage configuration defining mirrored pairs of the plurality of logical storage units.

15 Claims, 3 Drawing Sheets

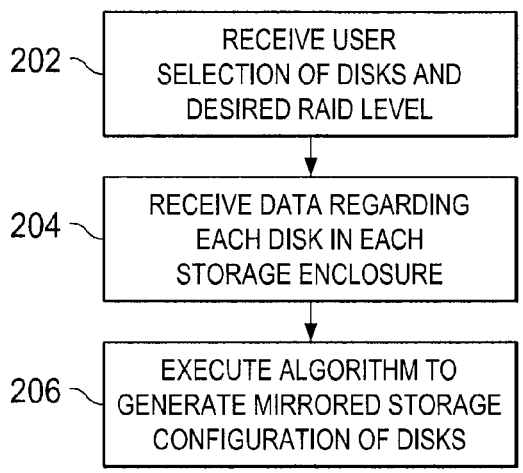
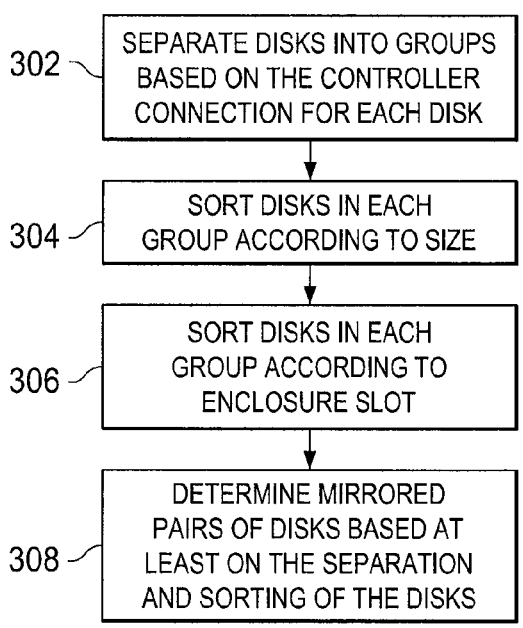
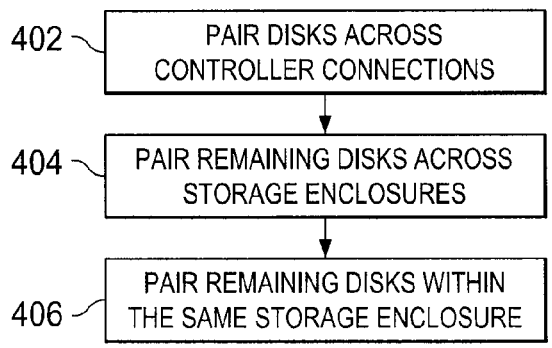

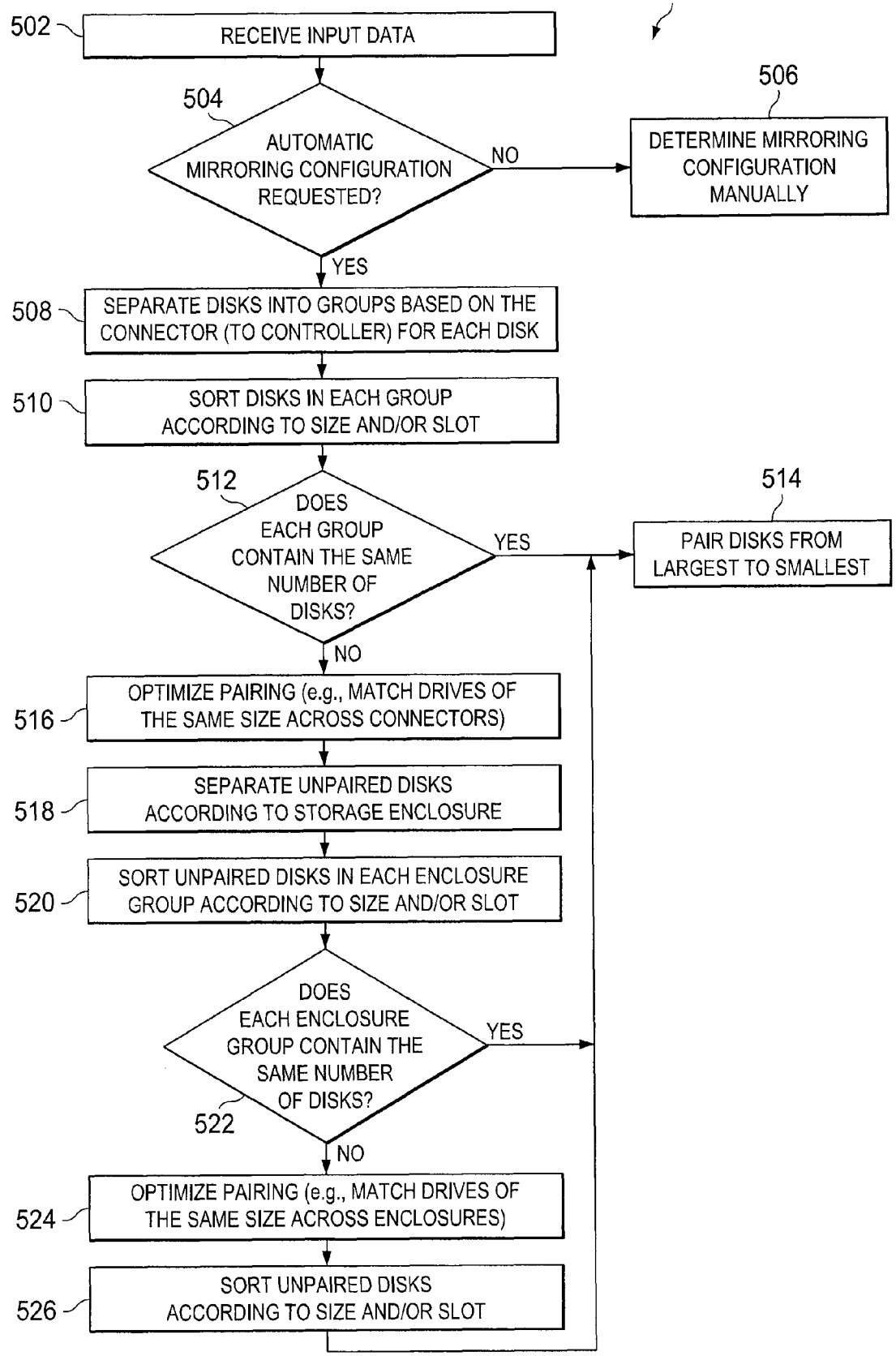

SYSTEMS AND METHODS FOR AUTOMATICALLY GENERATING A MIRRORED STORAGE CONFIGURATION FOR A STORAGE ARRAY

TECHNICAL FIELD

The present disclosure relates in general to redundant storage arrays, and more particularly, to systems and methods for automatically generating a mirrored storage configuration for a storage array.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often use an array of storage resources, such as a Redundant Array of Independent Disks (RAID), for example, for storing information. Arrays of storage resources typically utilize multiple disks to perform input and output operations and can be structured to provide redundancy which may increase fault tolerance. Other advantages of arrays of storage resources may be increased data integrity, throughput and/or capacity. In operation, one or more storage resources disposed in an array of storage resources may appear to an operating system as a single logical storage unit or "logical unit." Implementations of storage resource arrays can range from a few storage resources disposed in a server chassis, to hundreds of storage resources disposed in one or more separate storage enclosures.

Many storage arrays enable redundancy by "mirroring," in which an exact copy of data on one logical unit is copied onto one or more other logical units. To "mirror" storage resources, logical units (e.g., disk drives) are paired and the same data is stored on each of the two logical units. Thus, if the data in a particular logical unit becomes unavailable (e.g., due to a lost connection, a thermal-related problem, a disk drive failure, or a power failure), the data in that logical unit may remain available via its mirrored logical unit.

SUMMARY

In accordance with the teachings of the present disclosure, the disadvantages and problems associated with generating a redundant storage configuration have been substantially reduced or eliminated.

In accordance with one embodiment of the present disclosure, a method for automatically generating a mirrored storage configuration includes receiving data regarding a plurality of logical storage units located in multiple storage enclosures connected to a controller by multiple connections, and automatically executing an algorithm based on the received logical storage unit data to generate a mirrored storage configuration to be implemented, the mirrored storage configuration defining mirrored pairs of the plurality of logical storage units.

In accordance with another embodiment of the present disclosure, a system for automatically generating a mirrored storage configuration in an information handling system including a plurality of logical storage units located in multiple storage enclosures is provided. The system includes a controller coupled to the plurality of logical storage units located in multiple storage enclosures. The controller may be configured to receive data regarding the plurality of logical storage units, and automatically execute an algorithm based on the received logical storage unit data to generate a mirrored storage configuration to be implemented, the mirrored storage configuration defining mirrored pairs of the plurality of logical storage units.

In accordance with a further embodiment of the present disclosure, an information handling system may include a plurality of storage enclosures, a plurality of logical storage units located in each storage enclosure, a controller connected to each of the plurality of logical storage units. The controller is configured to receive data regarding the plurality of logical storage units, and automatically execute an algorithm based on the received logical storage unit data to generate a mirrored storage configuration to be implemented, the mirrored storage configuration defining mirrored pairs of the plurality of logical storage units.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 2 illustrates a high-level method for generating a mirrored storage configuration for a storage array based on received input data, according to some embodiments of the present disclosure;

FIG. 3 illustrates a method of an algorithm for automatically generating a mirrored storage configuration for a storage array, according to some embodiments of the present disclosure;

FIG. 4 illustrates a method of an algorithm for automatically generating a mirrored storage configuration for a storage array, where the group of disks in different connector groups do not completely match, according to some embodiments of the present disclosure; and FIG. 5 illustrates a method of an example algorithm for automatically generating a mirrored storage configuration for a storage array, according to a particular embodiment of the present disclosure.

DETAILED DESCRIPTION

Figure 1:
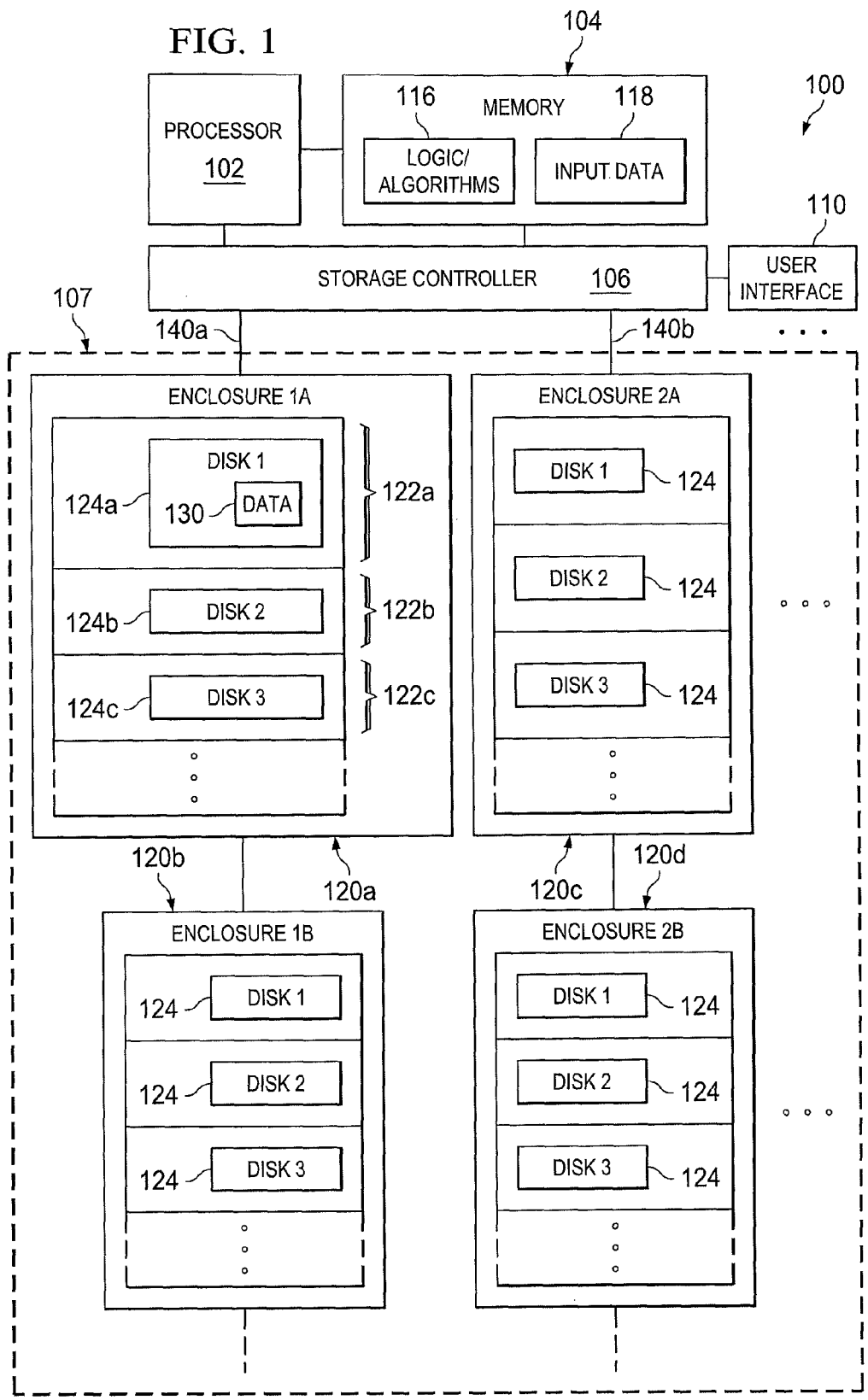
FIG. 1 illustrates a block diagram of an example information handling system for automatically generating a mirrored storage configuration for a storage array, in accordance with certain embodiments of the present disclosure.

Preferred embodiments and their advantages are best understood by reference to FIGS. 1-5, wherein like numbers indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

As discussed above, an information handling system may include or may be coupled via a storage network to an array of storage resources. The array of storage resources may include a plurality of storage resources, and may be operable to perform one or more input and/or output storage operations, and/or may be structured to provide redundancy. In operation, one or more storage resources disposed in an array of storage resources may appear to an operating system as a single logical storage unit or "logical unit."

In certain embodiments, an array of storage resources may be implemented as a Redundant Array of Independent Disks (also referred to as a Redundant Array of Inexpensive Disks or a RAID). RAID implementations may employ a number of techniques to provide for redundancy, including striping, mirroring, and/or parity checking. As known in the art, RAIDs may be implemented according to numerous RAID standards, including without limitation, RAID 0, RAID 1, RAID 0+1, RAID 3, RAID 4, RAID 5, RAID 6, RAID 01, RAID 03, RAID 10, RAID 30, RAID 50, RAID 51, RAID 53, RAID 60, RAID 100, etc.

FIG. 1 illustrates a block diagram of an example information handling system 100 for automatically generating a mirrored storage configuration for a storage array 107, in accordance with certain embodiments of the present disclosure. As depicted in FIG. 1, information handling system 100 may comprise a processor 102, a memory 104 communicatively coupled to processor 102, a storage controller 106 communicatively coupled to processor 102, a user interface 110, and a storage array 107 communicatively coupled to storage controller 106. In some embodiments, information handling system 100 may comprise a server or server system.

Processor 102 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 102 may interpret and/or execute program instructions and/or process data stored in memory 104 and/or other components of information handling system 100. For example, as discussed below, processor 102 may execute one or more algorithms stored in memory 114 associated with storage controller 106. In the same or alternative embodiments, processor 102 may communicate data to and/or from storage array 107 via storage controller 106.

Memory 104 may be communicatively coupled to processor 102 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 100 is turned off.

In some embodiments, memory 104 may store algorithms or other logic 116 for automatically generating mirrored storage configurations for storage array 107. In addition, memory 104 may store various input data 118 used by storage controller 106 for generating a mirrored storage configuration for storage array 107. Input data 118 may include, for example, selections or other input from a user via user interface 110 and/or data 130 received from logical storage units 124 (e.g., disks) in storage array 107 (as discussed below in greater detail).

Storage controller 106 may be communicatively coupled to processor 102 and/or memory 104 and include any system, apparatus, or device operable to manage the communication of data between storage array 107 and one or more of processor 102 and memory 104. As discussed below in greater detail, storage controller 106 may be configured to automatically generate or facilitate the automatic generation of mirrored storage configurations for storage array 107. In some embodiments, storage controller 106 may execute one or more algorithms or other logic 116 to generate a mirrored storage configuration. In addition, in some embodiments, storage controller 106 may provide functionality including, without limitation, disk aggregation and redundancy (e.g., RAID), input/output (I/O) routing, and/or error detection and recovery.

Storage controller 106 may be implemented using hardware, software, or any combination thereof. Storage controller 106 may cooperate with processor 102 and/or memory 104 in any suitable manner to provide the various functionality of storage controller 106. Thus, storage controller 106 may be communicatively coupled to processor 102 and/or memory 104 in any suitable manner. In some embodiments, processor 102 and/or memory 104 may be integrated with, or included in, storage controller 106. In other embodiments, processor 102 and/or memory 104 may be separate from, but communicatively coupled to, storage controller 106.

User interface 110 may include any systems or devices for allowing a user to interact with system 100. For example, user interface 110 may include a display device, a graphic user interface, a keyboard, a pointing device (e.g., a mouse), any or any other user interface devices known in the art. As discussed below, in some embodiments, user interface 110 may provide an interface allowing the user to provide various input and/or selections regarding the operation of system 100. For example, user interface 110 may provide an interface allowing the user to (a) select whether to have storage controller 106 automatically generate a mirrored storage configuration for storage array 107, (b) select a group of storage resources (e.g., disk drives) to be configured (e.g., mirrored) by storage controller 106, and/or (c) select a desired RAID level.

Algorithms or other logic 116 may be stored in memory 104 or other computer-readable media, and may be operable, when executed by processor 102 or other processing device, to perform any of the functions discussed herein for automatically generating a mirrored storage configuration for a storage array (e.g., storage array 107). Algorithms or other logic 116 may include software, firmware, and/or any other encoded logic.

Storage array 107 may comprise any number and/or type of storage resources, and may be communicatively coupled to processor 102 and/or memory 104 via storage controller 106. Storage resources may include hard disk drives, magnetic tape libraries, optical disk drives, magneto-optical disk drives, compact disk drives, compact disk arrays, disk array controllers, and/or any computer-readable medium operable to store data. In operation, storage resources in storage array 107 may be divided into logical storage units or LUNs. Each logical storage unit may comprise, for example, a single storage resource (e.g., a disk drive), multiple storage resources (e.g., multiple disk drives), a portion of a single storage resource (e.g., a portion of a disk drive), or portions of multiple storage resources (e.g., portions of two disk drives), as is known in the art.

In the example embodiments discussed below, each logical storage unit is a single disk drive 124. However, the concepts discussed herein apply similarly to any other types of storage resources and/or logical storage units.

The storage resources of storage array 107 may be arranged in any suitable manner. For example, storage array 107 may comprise one or more storage enclosures 120, each storage enclosure 120 including one or more disk drives 124. In the example embodiment shown in FIG. 1, each disk drive 124 is disposed in a slot 122 of a particular storage enclosure 120. For example, disk drive 124a is disposed in slot 122a of storage enclosure 120a, disk drive 124b is disposed in slot 122b of storage enclosure 120a, and disk drive 124c is disposed in slot 122c of storage enclosure 120a.

Storage enclosures 120 may include any type of enclosure or structure for housing one or more storage resources. For example, storage enclosures 120 may include chasses, racks, cabinets, or shelves. The multiple storage enclosures 120 in system 100 may be similar or different types and/or sizes of enclosures. Each storage enclosure 120 may include any suitable number of slots 122 for receiving any suitable number of disk drives 124. For example, one storage enclosure 120 may include 24 slots for receiving 24 disk drives.

Each storage enclosure 120, and thus each disk drive 124 in each storage enclosure 120, is connected to storage controller 106 by a controller connector 140. In some embodiments, multiple storage enclosures 120 may be connected to storage controller 106 via different controller connectors 140, in any suitable arrangement. For example, in the illustrated embodiment, storage enclosures 120a and 120b are connected to storage controller 106 via controller connector 140a, while storage enclosures 120c and 120d are connected to storage controller 106 via controller connector 140b. Such configuration may be used to provide redundancy such that if one controller connector 140 goes down, data may still be available via disk drives 124 connected to storage controller 106 via an operational connector 140.

Each disk drive 124 may store a data object 130 including various data regarding that disk drive. For example, data object 130 of disk drive 124a may include or define any or all of the following:

(a) a storage enclosure ID identifying the particular storage enclosure 120 in which disk drive 124a is located (i.e., enclosure 120a);

(b) a slot ID identifying the particular slot 122 in which disk drive 124a is located (i.e., slot 122a);

(c) a connector ID identifying a connector 140 by which disk drive 124a is connected to storage controller 106 (i.e., connector 140a);

(d) the storage size of disk drive 124a (e.g., 200 GB); and (e) the device type of disk drive 124a (e.g., a SAS drive or a SATA drive).

Data object 130 may also include any other suitable information regarding disk drive 124a.

In some embodiments, each disk drive 124 in array 107 may communicate its data object 130 to storage controller 106. Storage controller 106 may store such data objects 130 as input data 118, and use such input data 118 for automatically generate mirrored storage configurations for storage array 107, as discussed below.

FIG. 2 illustrates a high-level method 200 for generating a mirrored storage configuration for storage array 107 based on received input data, according to some embodiments of the present disclosure.

At step 202, storage controller 106 may receive user input via user interface 110. For example, an application associated with storage controller 106 may prompt a user for various selections regarding the configuration of storage array 107. For example, the application may prompt the user to select (a) whether to have storage controller 106 automatically generate a mirrored storage configuration for storage array 107, (b) a group of disk drives 124 to be configured/mirrored by storage controller 106, and/or (c) a desired RAID level for the mirrored storage configuration. Such user selections may be received via user interface 110 and stored in memory 104 as input data 118.

At step 204, storage controller 106 may receive data regarding some or all disk drives 124. Such data may be received from disk drives 124 themselves, from a user via user interface 110, and/or from another source. In some embodiments, each disk drive 124 in array 107 may communicate its data object 130 to storage controller 106. Storage controller 106 may store such data objects 130 and/or other received data regarding disk drives 124 in memory 104 as input data 118.

At step 206, storage controller 106 may automatically generate a mirrored storage configuration for storage array 107 based at least on input data 118 stored in memory 104. For example, storage controller 106 may execute one or more algorithms 116 to generate a mirrored storage configuration for the group of disk drives 124 selected by the user, according to the RAID level selected by the user, and based on the data objects 130 received from each disk drive 124. Methods 300, 400, and 500 discussed below regarding FIGS. 3-5 provide further details regarding the generation of mirrored storage configurations by storage controller 106.

FIG. 3 illustrates a method 300 of an algorithm for automatically generating a mirrored storage configuration for storage array 107, according to some embodiments of the present disclosure.

At step 302, the algorithm may separate the set of disk drives 124 selected for configuring into groups based on the controller connector 140 associated with each disk drive 124. In some embodiments, the algorithm may separate the disk drives 124 into n groups corresponding to n connectors 140 connected to storage controller 106. Thus, in the example configuration shown in FIG. 1 (assuming the configuration includes only the four enclosures 120 and two connectors 140 explicitly shown), the algorithm may separate disk drives 124 into two "connector groups" as follows:

Connector Group 1=disk drives 124 connected to storage controller via connector 140*a* (i.e., disk drives 124 in enclosures 120*a* and 120*b*); and Connector Group 2=disk drives 124 connected to storage controller via connector 140*b* (i.e., disk drives 124 in enclosures 120*c* and 120*c*).

At step 304, the algorithm may sort the disk drives 124 in each connector group according to size. For example, if Connector Group 1 includes ten 300 GB drives, fifteen 200 GB drives, and eight 100 GB drives, the algorithm may sort the drives to place the ten 300 GB drives at the top, followed by the fifteen 200 GB drives, and then followed by the eight 100 GB drives. The drives 124 in Connector Group 2 may be similarly sorted.

At step 306, the algorithm may sort the disk drives 124 of the same size in each connector group according to the slot 122 in which they are located. For example, the ten 300 GB drives in Connector Group 1 may be sorted according to their respective slots 122, e.g., sorted from closest to slot 1 (slot 122*a*) to furthest from slot 1 (slot 122*a*). Next, the fifteen 200 GB drives in Connector Group 1 may be sorted according to their respective slots 122, e.g., sorted from closest to slot 1 (slot 122*a*) to furthest from slot 1 (slot 122*a*). And so on, for each group of same-sized disks.

At step 308, the algorithm may determine pairs of disks 124 to mirror based at least on the separation and sorting of disks 124 performed at steps 302-306. For example, the algorithm may pair same-sized disks across connector groups according to the sorted list of disks for each connector group. Thus, the largest disks in Connector Group 1 may be matched with the same-sized largest disks in Connector Group 2, then the next-largest disks in Connector Group 1 may be matched with the same-sized disks in Connector Group 2, and so on.

After pairing same-sized disks across connector groups, remaining disks may be paired in any suitable manner according to the design of the algorithm. For example, method 400 of FIGS. 4 is one example method for performing step 308 when the disks in Connector Groups 1 and 2 do not match completely.

FIG. 4 illustrates a method 400 of an algorithm for automatically generating a mirrored storage configuration for storage array 107, where the group of disks in different connector groups do not completely match, according to some embodiments of the present disclosure. In some embodiments, method 400 may be performed at step 308 of method 300 (FIG. 3).

At step 402, the algorithm may pair disk drives 124 across connector groups after various separating and/or sorting of disks, e.g., as discussed above regarding step 308 of method 300. In some instances, one or more connector groups may have one or more remaining unpaired disk drives 124.

At step 404, the algorithm may attempt to pair remaining unpaired disk drives 124 across storage enclosures 120 within the same connector group. For example, if after the pairing of matching drives at step 402, storage enclosure 120*a* has eight remaining unpaired drives 124, and storage enclosure 120*b* has four remaining unpaired drives 124, the algorithm may pair the four drives 124 in enclosure 120*b* with four of the eight drives in enclosure 120*a* (i.e., matching the drives across storage enclosures).

At step 406, the algorithm may attempt to pair disk drives 124 remaining unpaired after step 404 within the same storage enclosure 120. For example, after pairing four drives 124 in enclosure 120*b* with four of the eight drives in enclosure 120*a* at step 404, the algorithm may pair the remaining four drives in enclosure 120*a* with each other. In some embodiments or situations, one or more disks 124 may remain unpaired.

The manner in which algorithm 116 handles unmatched disk drives 124 depends on the particular embodiment of the algorithm 116. For example, in some embodiments, the algorithm may prefer pairing a particular drive with a different-sized drive in another connector group rather than pairing the particular drive with a same-sized drive within the same connector group. Such algorithm 116 may be used for maximizing redundancy of storage.

In other embodiments, the algorithm may prefer pairing the particular drive with the same-sized drive in the same connector group rather than with the different-sized drive in the other connector group. Such algorithm 116 may be used for maximizing storage space.

Similarly, in some embodiments, the algorithm may prefer pairing a particular drive with a different-sized drive in another storage enclosure 120 rather than pairing the particular drive with a same-sized drive within the same storage enclosure 120, while in other embodiments, the algorithm may prefer pairing the particular drive with the same-sized drive within the same storage enclosure 120 rather than with the different-sized drive in the other storage enclosure 120.

In some embodiments, the particular matching preferences applied by algorithm 116 may be selected by a user, e.g., via user interface 110. For example, algorithm 116 or other logic may present the user (e.g., via user interface 110) with various options for matching preferences to be applied by algorithm 116. In some embodiments, algorithm 116 or other logic may present the user with options for maximizing one or more particular performance characteristics, e.g., redundancy, storage space, or power savings. Algorithm 116 may then determine (e.g., using a look-up table or algorithm) which particular matching preferences to apply in order to provide the performance characteristic(s) selected by the user.

FIG. 5 illustrates a method 500 of an example algorithm for automatically generating a mirrored storage configuration for storage array 107, according to a particular embodiment of the present disclosure.

At step 502, storage controller 106 may receive input data 118 from a user (via user interface 110), from disk drives 124, and/or from any other source, e.g., as described at steps 202 and 204 of method 200 (FIG. 2). For example, storage controller 106 may receive data objects 130 from disk drives 124, and user selections of (a) whether to initiate an automatic generation of a mirrored storage configuration for storage array 107, (b) a set of disk drives 124 to be configured/mirrored by storage controller 106, and/or (c) a desired RAID level for the mirrored storage configuration.

At step 504, the algorithm determines whether the user requested an automatically generated mirrored storage configuration for storage array 107 at step 502. If the user did not make such a request, the algorithm may direct the user to manually determine a mirrored storage configuration for storage array 107. Alternatively, if the user did request an automatically generated mirrored storage configuration at step 502, the algorithm may advance to step 508 to begin determining the mirrored storage configuration.

At step 508, the algorithm may separate the set of disk drives 124 selected by the user into groups (referred to herein as "connector groups") based on the controller connector 140 associated with each disk drive 124, e.g., as discussed above regarding step 302 of method 300 (FIG. 3).

At step 510, the algorithm may sort the disk drives 124 in each connector group according to disk drive size and/or slot 122, e.g., as discussed above regarding steps 304 and 306 of method 300 (FIG. 3).

After grouping and sorting the disk drives 124, at step 510 the algorithm may determine whether each connector group includes the same number of disk drives 124. If so, at step 514 the algorithm may pair the disk drives 124 across connector groups according to the grouping and sorting performed at steps 508 and 510. For example, the largest disks in Connector Group 1 may be matched with the same-sized largest disks in Connector Group 2, then the next-largest disks in Connector Group 1 may be matched with the same-sized disks in Connector Group 2, and so on.

Alternatively, if it is determined at step 512 that the each connector group does not include the same number of disk drives 124, the algorithm may proceed to step 516 to begin a process to optimize pairing (e.g., for maximum redundancy and/or storage size).

At step 516, the algorithm may match same-sized disk drives 124 across connector groups according to the sorting performed at step 510. A number of disk drives 124 remain unpaired.

At step 518, for each connector group, the algorithm may separate the unpaired disk drives 124 into groups (referred to herein as "enclosure groups") according to their respective storage enclosures 120. For example, for Connector Group 1, the algorithm may create a first group including unpaired disk drives 124 in enclosure 120a and a second group including unpaired disk drives 124 in enclosure 120b.

At step 520, the algorithm may then sort the disk drives 124 in each enclosure group according to disk drive size and/or slot 122.

At step 522, the algorithm may determine whether each enclosure group contains the same number of disk drives 124. If so, the algorithm proceeds to step 514, in which the algorithm may pair the disk drives 124. In this particular embodiment, the algorithm first pairs the disk drives 124 across connector groups according to the matching at step 516, then pairs remaining unpaired disk drives 124 within connector groups according to the grouping and sorting performed at steps 518 and 520.

Alternatively, if it is determined at step 522 that the each enclosure group does not include the same number of disk drives 124, the algorithm may proceed to step 524 to continue optimizing the pairing process for disk drives 124 remaining unpaired after the matching of drives across connector groups at step 516.

At step 524, the algorithm may match same-sized unpaired disk drives 124 across enclosure groups within the same connector group. For example, unpaired 250 GB drives in enclosure 120c may be matched with unpaired 250 GB drives in enclosure 120d. A number of disk drives 124 may still remain unpaired.

At step 526, the algorithm may then sort the remaining unpaired disk drives 124 in each enclosure group according to disk drive size and/or slot 122.

The algorithm may then proceed to step 514, in which the algorithm may pair the disk drives 124. In this particular embodiment, the algorithm first pairs the disk drives 124 across connector groups according to the matching at step 516, then pairs remaining unpaired disk drives 124 across enclosure groups according to the matching at step 524, then pairs remaining unpaired disk drives 124 within particular enclosure groups according to the sorting performed at step 526.

Although FIGS. 2-5 each disclose a particular number of steps to be taken with respect to methods 200, 300, 400, and 500, it is understood that any of methods 200, 300, 400, or 500 may be executed with greater or lesser steps than those depicted in FIGS. 2-5. In addition, although FIGS. 2-5 disclose a certain order of steps to be taken with respect to methods 200, 300, 400, and 500, the steps comprising each method 200, 300, 400, and 500 may be completed in any suitable order.

Any of methods 200, 300, 400, and 500 may be implemented using information handling system 100 or any other system operable to implement methods 200, 300, 400, and 500. In certain embodiments, methods 200, 300, 400, and 500 may be implemented partially or fully in software embodied in tangible computer readable media, e.g., algorithms or other logic 116 stored in memory 104.

Although the present disclosure has been described in detail, it should be understood that various changes, substitutions, and alterations can be made hereto without departing from the spirit and the scope of the disclosure as defined by the appended claims.

What is claimed is:

1. A method for automatically generating a mirrored storage configuration, comprising:
   receiving data regarding a plurality of logical storage units located in multiple storage enclosures connected to a single controller by multiple connections, the data including data identifying, for each logical storage unit, an established data connection between that logical storage unit and the controller; and
   automatically executing an algorithm based on the received logical storage unit data to generate a mirrored storage configuration;
   separating the plurality of logical storage units into groups based on the established data connection between the controller and each logical storage unit;
   sorting the logical storage units in each group based on a storage size of each logical storage unit; and
   determining mirrored pairs of the plurality of logical storage units based at least on:
      the established data connection between the controller and each logical storage unit;
      the groups of the logical storage units; and
      the size of the logical storage units within the groups.

2. A method according to claim 1, further comprising receiving at least a portion of the data regarding the plurality of logical storage units from a user via a user interface.

3. A method according to claim 1, further comprising receiving from a user:
   a selection of the group of logical storage units; and
   a selection of a RAID level.

4. A method according to claim 1, wherein:
   receiving data regarding a plurality of logical storage units further comprises automatically receiving data from a data object stored in each logical storage unit; and
   the data object for each logical storage unit defines at least one of:
      a storage enclosure ID identifying a particular storage enclosure in which the logical storage unit is located;
      a slot ID identifying a particular slot in which the logical storage unit is located;
      a connector ID identifying a particular data connection between the controller and the logical storage unit;
      the storage size of the logical storage unit; and the type of the logical storage unit.

5. A method according to claim 1, wherein:
the received logical storage unit data further includes data identifying a storage size of each logical storage unit; and
automatically executing an algorithm based on the received logical storage unit data to generate a mirrored storage configuration further comprises determining the mirrored pairs of the plurality of logical storage units based at least on the storage size of each logical storage unit.

6. A method according to claim 1, wherein automatically executing an algorithm based on the received logical storage unit data to generate a mirrored storage configuration further comprises:
pairing logical storage units connected to the controller by different established connections;
after pairing logical storage units connected to the controller by different established connections, pairing remaining logical storage units located in different storage enclosures; and
after pairing remaining logical storage units located in different storage enclosures, pairing remaining logical storage units located within the same storage enclosure.

7. A system for automatically generating a mirrored storage configuration in an information handling system including a plurality of logical storage units located in multiple storage enclosures, the system comprising:
a single controller coupled to the plurality of logical storage units located in multiple storage enclosures, the controller configured to:
receive data regarding the plurality of logical storage units, the data including data identifying, for each logical storage unit, an established data connection between that logical storage unit and the controller; and
automatically execute an algorithm based on the received logical storage unit data to generate a mirrored storage configuration;
separate the plurality of logical storage units into groups based on the established data connection between the controller and each logical storage unit;
sort the logical storage units in each group based on a storage size of each logical storage unit; and
determine mirrored pairs of the plurality of logical storage units based at least on:
the established data connection between the controller and each logical storage unit;
the groups of the logical storage units; and
the size of the logical storage units within the groups.

8. A system according to claim 7, wherein the controller is further configured to receive at least a portion of the data regarding the plurality of logical storage units from a user via a user interface.

9. A system according to claim 7, wherein the controller is further configured to:
receive from a user a selection of the group of logical storage units, and a selection of a RAID level; and
automatically execute an algorithm based at least on the selected group of logical storage units and the selected RAID level.

10. A system according to claim 7, wherein:
the controller is further configured to receive a data object stored in each logical storage unit; and
the data object for each logical storage unit defines at least one of:
a storage enclosure ID identifying a particular storage enclosure in which the logical storage unit is located;
a slot ID identifying a particular slot in which the logical storage unit is located;
a connector ID identifying a particular data connection between the controller and the logical storage unit;
the storage size of the logical storage unit; and
the type of the logical storage unit.

11. A system according to claim 7, wherein:
the received logical storage unit data further includes data identifying a storage size of each logical storage unit; and
the controller is further configured to determine the mirrored pairs of the plurality of logical storage units based at least on the storage size of each logical storage unit.

12. A system according to claim 7, wherein the controller is further configured to:
pair logical storage units connected to the controller by different established connections;
after pairing logical storage units connected to the controller by different established connections, pair remaining logical storage units located in different storage enclosures; and
after pairing remaining logical storage units located in different storage enclosures, pair remaining logical storage units located within the same storage enclosure.

13. An information handling system, comprising:
a plurality of storage enclosures;
a plurality of logical storage units located in each storage enclosure; and
a single controller connected to each of the plurality of logical storage units, the controller configured to:
receive data regarding the plurality of logical storage units, the data including data identifying, for each logical storage unit, an established data connection between that logical storage unit and the controller; and
automatically execute an algorithm based on the received logical storage unit data to generate a mirrored storage configuration;
separate the plurality of logical storage units into groups based on the established data connection between the controller and each logical storage unit;
sort the logical storage units in each group based on a storage size of each logical storage unit; and
determine mirrored pairs of the plurality of logical storage units based at least on:
the established data connection between the controller and each logical storage unit;
the groups of the logical storage units; and
the size of the logical storage units within the groups.

14. An information handling system according to claim 13, wherein:
the controller is further configured to receive data from a data object stored in each logical storage unit; and
the data object for each logical storage unit defines at least one of:
a storage enclosure ID identifying a particular storage enclosure in which the logical storage unit is located;
a slot ID identifying a particular slot in which the logical storage unit is located;
a connector ID identifying a particular data connection between the controller and the logical storage unit;
the storage size of the logical storage unit; and
the type of the logical storage unit.

15. An information handling system according to claim 13, wherein the controller is further configured to:

pair logical storage units connected to the controller by different established connections after pairing logical storage units connected to the controller by different established connections, pair remaining logical storage units located in different storage enclosures; and after pairing remaining logical storage units located in different storage enclosures, pair remaining logical storage units located within the same storage enclosure.

* * * * *